July 5, 1960 A. M. REUSING ET AL 2,943,537
CUTTING TOOL
Filed Feb. 28, 1958 2 Sheets-Sheet 1

INVENTORS
JOHN HERR EBERLY
ALBERT M. REUSING

BY
ATTORNEY

July 5, 1960 A. M. REUSING ET AL 2,943,537
CUTTING TOOL

Filed Feb. 28, 1958 2 Sheets-Sheet 2

INVENTORS
JOHN HERR EBERLY
ALBERT M. REUSING
BY
ATTORNEY

United States Patent Office 2,943,537
Patented July 5, 1960

2,943,537

CUTTING TOOL

Albert M. Reusing and John H. Eberly, Lancaster, Pa., assignors to Sperry Rand Corporation, New Holland, Pa., a corporation of Delaware Filed Feb. 28, 1958, Ser. No. 718,359

6 Claims. (Cl. 90—1.4)

This invention relates to a tool of the portable type which is operable relative to the outer end of a splined shaft to cut a radius on one side of the end of the male members or splines of such splined shaft so as to at least partially taper the end of such splines.

Splined shafts usually are provided on agricultural tractors and the like to comprise a power take-off shaft which is driven by the engine of the tractor selectively either while the tractor is moving or stationary. Such power take-off shaft thus may drive auxiliary farm equipment of a stationary nature such as silo filling equipment, or various types of portable farm equipment may be hitched to the tractor and pulled thereby and driven members of such equipment may be connected to the power take-off shaft of the tractor so as to be operated thereby while the equipment is being propelled by the tractor, for example.

Certain types of agricultural implements now preferably utilize coupling members for attachment to the power take-off shafts of tractors and such coupling members are connectible more readily to the power take-off shaft if the ends of the splines thereon are tapered. However, the splined power take-off shafts on existing tractors and the like have only substantially square ends. Hence, in order to facilitate the coupling of newer equipment to this type of square-end power take-off shafts, it is preferable that the splines of the shafts be tapered more or less, at least on one side of each spline at the outer end thereof. Also, it is preferable that tapering of such outer ends of the splines, or cutting a radius on at least one side of each spline, be accomplished in the field, without requiring that the tractor be taken to a garage or machine shop in order to have this operation accomplished.

It is the principal object of the present invention to provide a manually operated, portable tool attachable readily to the outer end of a splined, power take-off shaft and indexed relative to the splines thereon, the tool including a movable member carrying a metal-cutting element which is movable relative to one side of the outer ends of the splines of such power take-off shafts in order to cut a radius on said one side of each of the splines of said shafts.

Another object of the invention is to provide such a tool with clamping means by which the tool securely but detachably may be clamped relative to the outer end of the splined shaft, and the metal-cutting element of the tool is arranged to be fed progressively in one direction so as to make a plurality of successive and progressive cuts on one side of the outer end of each spline of the shaft until a radius of desired size and shape is formed upon the outer end of each spline.

Still another object of the invention is to provide adjustable supporting means on the tool by which the cutting element is held in operative position and such supporting means include a pivoted tool holder which permits the tool to move to inoperative position at the end of each cut and thereby permits ready return of the tool cutting member to starting position with only light, overriding engagement of the cutting member with the splines of the shaft during such return movement.

Details of the foregoing objects and of the invention, as well as other objects thereof, are set forth in the following specification and illustrated in the accompanying drawing comprising a part thereof.

Although the tool comprising the present invention primarily is applicable to operate upon the outer end of a splined power take-off shaft, generally known in the trade as a P.T.O. shaft, it is to be understood that said tool may be used to cut radii on the outer ends of the splines of any type of splined shaft upon which it is desired to form radii on at least one side of one or more of the splines of said shafts.

Figure 1:
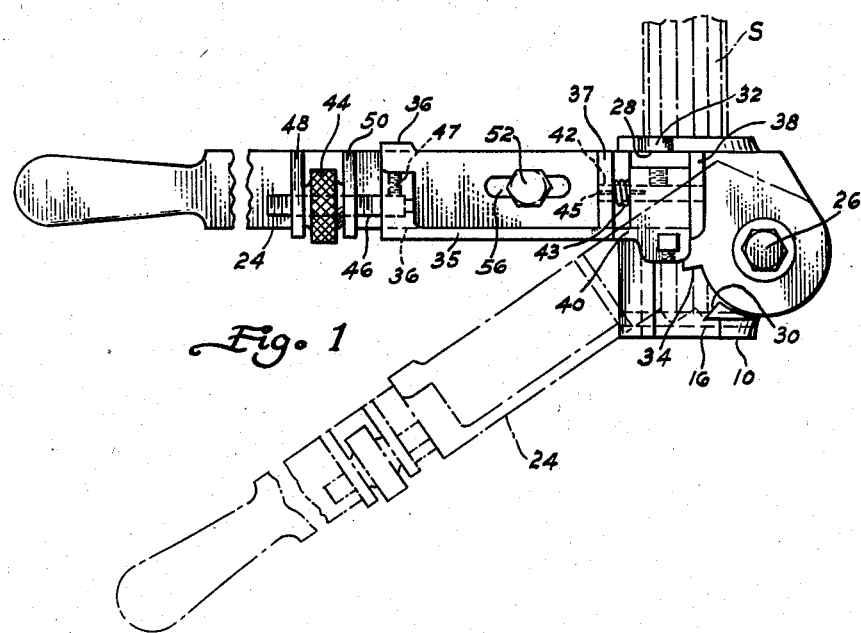
Fig. 1 is a top plan view showing in full lines a tool embodying the principles of the present invention with the parts thereof positioned to start the cutting movements of the tool, while in broken lines, the handle member which carries the cutting tool is shown at the end of the cutting stroke.
Figure 2:
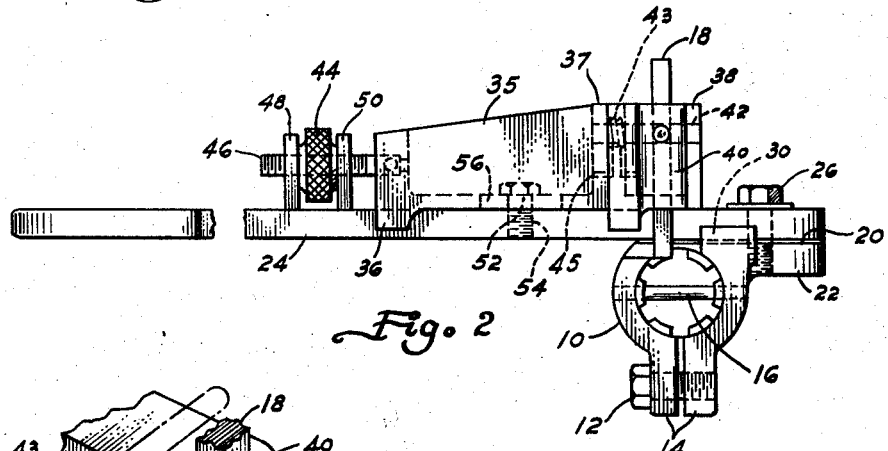
Fig. 2 is a side elevation of the tool shown in Fig. 1 positioned at the start of its cutting movement and illustrated in clamped position upon the outer end of a splined shaft.

Referring to Figs. 1 and 2 particularly, it will be seen that a fragmentary, outer end portion of a splined shaft S is illustrated and said shaft represents generally splined shafts of the type particularly used in agricultural equipment and draft vehicles such as tractors. The tool comprising the present invention includes a base member 10 which conveniently may be formed in the nature of a split sleeve which receives and is held in clamped position upon the outer end of the splined shaft S by clamping means specifically illustrated as a bolt 12 which extends through one of a pair of parallel ears 14 and is threaded into the opposite ear as clearly shown in Fig. 2. By tightening the bolt 12, the sleeve-like base member 10 securely is clamped in a predetermined position upon the outer end of the splined shaft S. In order that the base 10 may be disposed in desired position upon the outer end of shaft S, the same may be provided with any suitable positioning means such as a cross-pin 16 which extends through opposite walls of the base member 10 and abuts the outer end of the shaft S when the member 10 is mounted in desired position thereon, following which the clamping bolt 12 is tightened.

Figure 3:
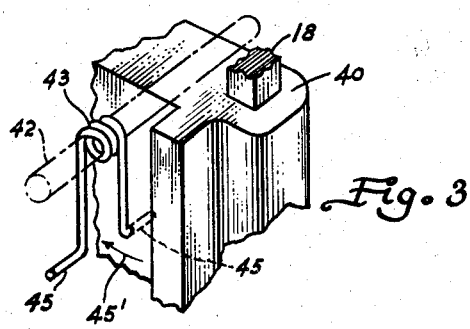
Fig. 3 is a fragmentary perspective view illustrating certain portions of the pivoted mounting means which support the cutter element.
Figure 4:
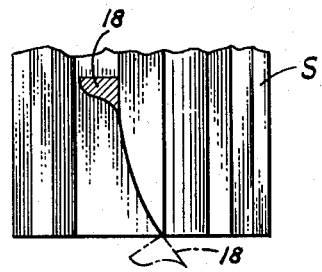
Fig. 4 is a fragmentary, diagrammatic top plan view showing in full lines the finished shape of a spline upon which a radius has been cut by the cutting element of the tool, said view also indicating the opposite extremities of the path of movement of the cutting element.

Cutter element 18 is illustrated in exemplary manner in Figs. 1 through 4, the same being of a type such as used in machine shops on lathes and the like for cutting metal, the cutting end of the element 18 being suitably ground to cutting shape such as illustrated in one possible form in Fig. 4. However, the shank of the cutter element 18 preferably is square or rectangular as shown in Figs. 1 and 3.

Base member 10 has a laterally extending, preferably flat upper surface 20 formed upon an integral lateral projection 22 for purposes of providing a supporting surface against which one end of a handle 24 is mounted for pivotal movement by a pintle 26, illustrated specifically as a bolt which is threaded at one end into the lateral projection 22. Projecting upwardly from the base member 10 is a stop member 28 and, on the opposite end of the base 10, another stop member 30 projects upwardly.

Handle 24 is provided with a substantially vertical abutment 32 which is engageable at the start or commencement of the cutting operation with stop member 28, and on the opposite side of handle 24, a laterally extending stop projection 34 is provided which is engageable at the end of the cutting movement with stop member 30 on base 10. The above described stop members are best illustrated in Fig. 1.

Longitudinally slidable upon the handle 24 is a tool carriage 35 which preferably has depending ears 36 which slidably engage opposite parallel sides of the mid-portion of handle 24 so as to guide the carriage 35 during adjustment thereof longitudinally of the handle 24 for purposes to be described. Carriage 35 also is provided with a pair of vertical parallel wall members 37 and 38 between the opposed walls of which a tool head 40 is pivotally supported by a pin or shaft 42 which extends between said wall members and is substantially parallel to handle 24.

Tool head 40 is in the nature of an irregularly shaped block, best illustrated perspectively in Fig. 3, and having an abutting face 41 on a vertical lug or rib thereon. A coil spring 43 surrounds a portion of shaft 42, the opposite ends 45 of which are bent away from each other and are received respectively within wall member 37 and tool head 40. The tension of the spring 43 is such as normally to move the tool head 45 into cutting position, in the direction of the arrow 45' shown in Fig. 3, thereby positioning the lower, cutting end of cutter element 18 into operative position which is the position it occupies when the handle 24 is moving from the full line or operative position thereof shown in Fig. 1, to the broken line position occupied by the various members at the completion of a cutting stroke. The cutter element 18 may be held longitudinally adjustable within tool head 40 by any suitable means such as a set screw.

Figure 5:
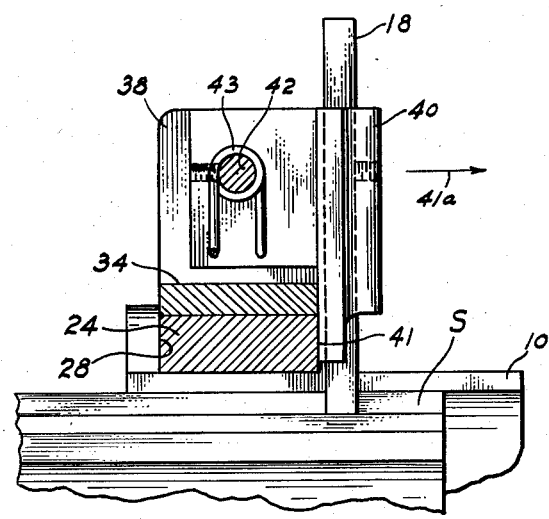
Fig. 5 is an enlarged vertical sectional view taken on the line 5—5 of Fig. 2 and showing the tool in position to effect a cut on one side of a spline.
Figure 6:
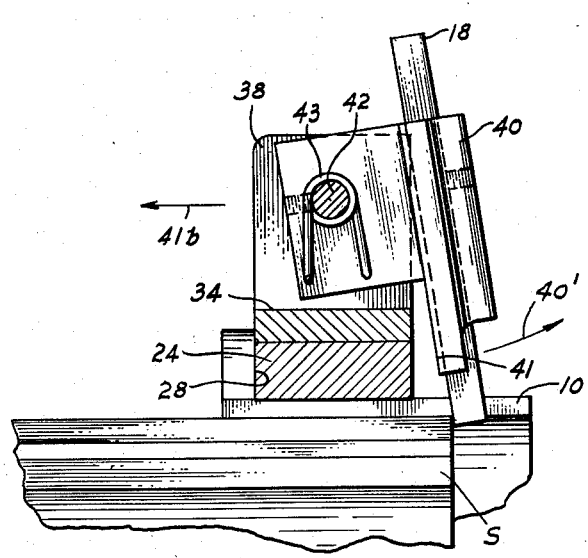
Fig. 6 is a view similar to Fig. 5 but showing the tool head in the process of being moved pivotally to inoperative position upon the return movement of the tool taking place.

To better illustrate the function of spring 43 and the operative position of tool head 40 and cutter element 18 during the cutting stroke of the tool, attention is directed to Fig. 5, wherein it will be seen that the abutting face 41 on head 40 firmly engages one side of handle 24 abuttingly while handle 24 moves in the direction of arrow 41a. This provides adequate bracing of the tool head during a cutting stroke. However, when the handle and the cutting mechanism carried thereby reaches the end of the cutting stroke, indicated by the exemplary broken line position shown in Fig. 1, and the movement of the handle is reversed to travel in the direction of arrow 41b, the tool head 40 moves pivotally in the direction of arrow 40' in Fig. 6 to permit the cutting end of element 18 to override the splined shaft and thus minimize wear upon the cutting element.

A knurled thumb nut 44 is threaded upon an adjusting shaft 46, one end of the shaft being secured by a set screw 47 to the end of tool carriage 35 adjacent nut 44. Handle 24 is provided with a pair of parallel positioning ears 48 and 50 which project laterally from one face thereof and the inner faces of the ears 48 and 50 engage the opposite ends of thumb nut 44 to position it therebetween so as to prevent movement thereof axially of the handle 24.

Guiding and clamping means for the tool carriage 35 are provided in the form of a clamping bolt 52, the threaded end of which is engaged within a threaded hole 54 formed in handle 24 as best shown in Fig. 2. The outer end of bolt 52 is received within slot 56 formed within tool carriage 35 and extending longitudinally thereof.

In operation, the collar-like base 10 of the tool is clamped upon the outer end of splined shaft S in such manner that when the handle 24 is in the full line position thereof shown in Fig. 1, the cutting end of cutter element 18 is substantially parallel to one side wall of one of the splines of shaft S. Clamping bolt 12 then is tightened and tool carriage 35 is backed off from said side surface of the spline so that upon first moving the handle 24 from the full line to the broken line position thereof shown in Fig. 1, a light cut will be taken off of the outer end only of one side of said spline. At the end of the cutting stroke and the comencement of the return stroke of the handle, the spring 43 automatically will yield and permit the cutting end of cutter element 18 to move outwardly from engagement with the spline and override it. Thus, wear upon the cutting end of the cutter element 18 will be minimized and spring 43 automatically will restore the cutting element to cutting position at the completion of such return engagement. Thumb nut 44 then is operated to advance the tool head 40 toward the spline a little, such as a few thousandths of an inch, and the cutting operation is repeated, thereby cutting a little more radius upon the spline until finally, after a number of cutting movements of the tool have been effected, the top plan view of the spline will appear as shown in Fig. 4, wherein the spline is somewhat tapered, at least on one side.

The clamping bolt 52 normally is backed off slightly from clamping position during the cutting operation described above and the principal function of the bolt 52, under such circumstances, is to guide the tool carriage 35 in operative position upon the handle 24. However, particularly where relatively deep cuts might be desired, it may be necessary to tighten bolt 52 each time the handle is moved in cutting direction, while when the tool carriage 35 is adjusted toward cutting position, the bolt 52 first is loosened. Bolt 52 thereby locks the cutter element and tool carriage 35 relative to handle 24. Otherwise however, clamping bolt 52 serves primarily as a steadying and guide means for the tool carriage 35 relative to handle 24.

From the foregoing, it will be seen that the present invention provides a relatively simple, yet highly effective tool which is manually operated and may be used in the field, for example, to cut radii upon one side of the ends of the various splines of a splined shaft, whereby an initially square ended splined shaft may be rendered suitable for use with a coupling member of an agricultural implement or the like to be connected to said splined shaft, particularly where such coupling operation is facilitated by the splines having radii cut on the end thereof.

While the invention has been described and illustrated in its preferred embodiment, and has included certain details, it should be understood that the invention is not to be limited to the precise details herein illustrated and described since the same may be carried out in other ways falling within the scope of the invention as claimed.

We claim:

1. A manually operable spline cutting and shaping tool operable to cut radii on the side walls of splines extending inward from the outer end of a splined shaft and comprising in combination, a base arranged to receive a splined shaft and be positioned thereon in predetermined relationship relative to the splines in the outer end of said shaft, handle means pivotally connected at one end to said base for movement about an axis transverse to the axis of the shaft and parallel to the side wall of a spline upon which a radius is desired to be cut, and cutter means adjustably carried by said handle means and movable directly therewith arcuately about the axis of the pivotal connection of said handle with said base, said cutter means also being engageable with the outer end of one of the side walls of one of said splines of said shaft, whereby when said handle is moved pivotally in one direction relative to said base said cutter will cut one of the side walls of the spline of said shaft generally to taper the same.

2. The tool set forth in claim 1 further characterized by said base and handle also having co-engageable stop means operable to limit the movement of said handle in opposite directions relative to said base.

3. The manually operable spline cutting and shaping tool set forth in claim 3 further characterized by said handle being elongated and having a carriage carried thereby and adjustably positionable longitudinally along said handle, said cutter means being carried by said carriage and engageable with the outer end of one of the walls of the splines of said shaft, whereby when said handle is moved relative to said base in one direction said cutter will cut the wall at one side of the spline of said shaft generally to taper the same.

4. The tool set forth in claim 3 further including means on said handle engaging said carriage and operable to move the same longitudinally of said handle to position the cutter for various depths of cut.

5. A manually operable spline cutting and shaping tool operable to cut radii on the side walls of splines extending inward from the outer end of a splined shaft and comprising in combination, a base arranged to receive a splined shaft and be clamped thereon in predetermined relationship relative to the splines in the outer end of said shaft, handle means pivotally connected at one end to said base for movement about an axis transverse to the axis of the shaft and parallel to the side wall of a spline upon which a radius is desired to be cut, shaft means carried by and extending substantially parallel to said handle, and cutter means pivotally supported by said shaft means upon said handle means, whereby when said handle is moved in one direction said cutter will engage the outer end portion of one of side walls of said splines to cut the same generally to taper the same, said pivotal support for said cutter permitting the same to be pivotally movable to inoperative position out of contact with said side wall of said spline when said handle is moved in the other direction.

6. The tool set forth in claim 5 further including spring means engaging said cutter means and operable to urge said said cutter means normally into cutting position but being yieldable to permit said cutter means to override said spline when said handle is moving in non-cutting direction.

References Cited in the file of this patent

UNITED STATES PATENTS

| 1,471,864 | Sentou | Oct. 23, 1923 |
| 2,028,293 | O'Brien | Jan. 21, 1936 |
| 2,263,870 | Currie | Nov. 25, 1941 |

FOREIGN PATENTS

| 326,102 | Germany | Sept. 24, 1920 |
| 790,786 | Great Britain | Feb. 19, 1958 |